US012098342B2

(12) United States Patent
Marsh et al.

(10) Patent No.: US 12,098,342 B2
(45) Date of Patent: Sep. 24, 2024

(54) LUBRICATING OIL COMPOSITIONS

(71) Applicant: Infineum International Limited, Abingdon (GB)

(72) Inventors: Adam Paul Marsh, Witney (GB); Mark Jackson, Abingdon (GB)

( * ) Notice: Subject to any disclaimer, the term of this patent is extended or adjusted under 35 U.S.C. 154(b) by 0 days.

(21) Appl. No.: 18/338,198

(22) Filed: Jun. 20, 2023

(65) Prior Publication Data

US 2024/0018439 A1 Jan. 18, 2024

(30) Foreign Application Priority Data

Jul. 6, 2022 (EP) .................................... 22183288

(51) Int. Cl.

| | |
|---|---|
| ***C10M 129/91*** | (2006.01) |
| ***B63H 21/38*** | (2006.01) |
| ***C10M 169/04*** | (2006.01) |
| ***F02M 25/00*** | (2006.01) |
| *C10N 30/04* | (2006.01) |
| *C10N 40/25* | (2006.01) |

(52) U.S. Cl.

CPC ......... *C10M 129/91* (2013.01); *B63H 21/386* (2013.01); *C10M 169/04* (2013.01); *F02M 25/00* (2013.01); *C10M 2203/003* (2013.01); *C10M 2207/024* (2013.01); *C10M 2207/025* (2013.01); *C10N 2030/04* (2013.01); *C10N 2040/253* (2020.05)

(58) Field of Classification Search

CPC .............. C10M 129/91; C10M 169/04; C10M 2203/003; C10M 2207/024; C10M 2207/025; B63H 21/386; F02M 25/00; C10N 2030/04; C10N 2040/253

USPC .......................................................... 508/110

See application file for complete search history.

(56) References Cited

U.S. PATENT DOCUMENTS

| | | | | |
|---|---|---|---|---|
| 3,251,801 A * | 5/1966 | Boag | C07C 37/07 | 524/343 |
| 2010/0062957 A1* | 3/2010 | Bertram | C10M 159/22 | 508/463 |

FOREIGN PATENT DOCUMENTS

| | | |
|---|---|---|
| EP | 3778841 A1 | 2/2021 |
| JP | 2017043684 | 3/2017 |
| WO | 2010124860 A1 | 11/2010 |

OTHER PUBLICATIONS

European Search Report Application No. 22183288.4.

* cited by examiner

*Primary Examiner* — Prem C Singh
*Assistant Examiner* — Francis C Campanell
(74) *Attorney, Agent, or Firm* — Robert A. Migliorini

(57) ABSTRACT

A lubricating oil composition comprises 50 mass % or more of an oil of lubricating viscosity and 0.1 to 25 mass % of at least one of compounds of structures (I), (II), or (III).

(I)

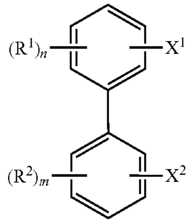

(II)

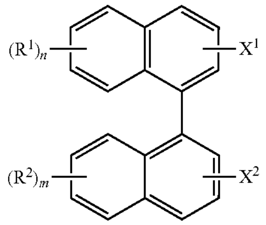

(III)

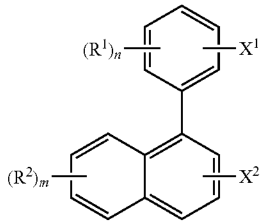

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero. The compositions are useful to ameliorate or prevent deposits in engines and provide good asphaltene dispersancy.

36 Claims, No Drawings

LUBRICATING OIL COMPOSITIONS

PRIORITY CLAIM

This application claims priority to and the benefit of European Patent Application EP 22183288.4, filed Jul. 6, 2022.

FIELD OF THE INVENTION

This invention relates to lubricating oil compositions which provide enhanced engine cleanliness. The compositions are suitable, for example, for lubricating the crankcase of an engine, particularly those of compression-ignited engines such as medium-speed, four-stroke, compression-ignited (diesel) trunk piston engines. The compositions may further be lubricating compositions useful in the lubrication of heavy-duty diesel engines.

BACKGROUND OF THE INVENTION

Effective lubrication of the crankcase of an engine is necessary to maintain the performance and expected operational lifetime of the engine, for example by keeping the engine as clean as possible. Trunk piston engines may be used in marine, power-generation and rail traction applications, wherein a single lubricant (TPEO) is used for crankcase and cylinder lubrication. All major moving parts of the engine, i.e. the main and big end bearings, camshaft and valve gear, are lubricated by means of a pumped circulation system. The cylinder liners are lubricated partially by splash lubrication and partially by oil from the circulation systems that finds its way to the cylinder wall through holes in the piston skirt via the connecting rod and gudgeon pin.

Marine trunk piston engines are operated with many different compositions of fuels. These fuels, known as bunker fuels, are described broadly by the specification to which they are produced, ISO 8217. Selection of fuel used on a ship is dependent on of many factors such as emissions legislation, sailing routes and availability, and the ability to switch between fuels without impacting engine reliability is commercially attractive. Heavy Fuel Oils (HFO) have been used extensively in this application and comprise a complex mixture of molecules including of asphaltenes. Asphaltenes are defined as the fraction of petroleum distillate that is insoluble in an excess of aliphatic hydrocarbon (e.g., heptane) but which is soluble in aromatic solvents (e.g., toluene), and can enter the engine lubricant as contaminants either via the cylinder or the fuel pumps and injectors. The impact of significant asphaltene contamination of the lubricant is high levels of engine deposition potentially resulting in total engine failure. Driven by health and environmental concerns, there has been increasing interest in the use of low sulfur fuel ('distillates') for the operation of trunk piston engines. Emissions from distillates contain significantly less particulate matter, soot and sulphurised gases. The fuels typically characterised by a lower sulfur content and increased levels of lighter fractional distillation constituents. Typically, operational issues with distillate fuels are distinct from those of their residual relations; lacquer deposits on cylinder liners and other surfaces being the most predominant concern.

References of interest include: JP 2017 043684 A, WO 2010/124860; and EP 3 778 841 A1.

It is desirable to provide TPEOs designed for use with multiple fuels where the TPEO oxidative stability, viscosity increase control are retained whilst improved detergency performance is enabled. In the present invention, it has been found that lubricating oil compositions incorporating certain substituted bi-aryl compounds provide excellent cleanliness when used to lubricate engines of various types.

It has now been found that certain compounds which share a structural feature of having directly-linked, substituted aryl groups are effective as additives in lubricating oil compositions to reduce or prevent harmful deposits on engine parts lubricated by the compositions. The compounds are also effective to prevent asphaltene agglomeration.

SUMMARY OF THE INVENTION

In a first aspect, the present invention provides a lubricating oil composition comprising 50 mass % or more of an oil of lubricating viscosity and 0.1 to 25 mass % of at least one of compounds of structures (I), (II), or (III):

(I)

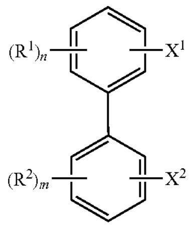

(II)

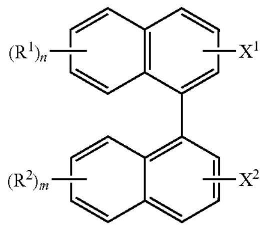

(III)

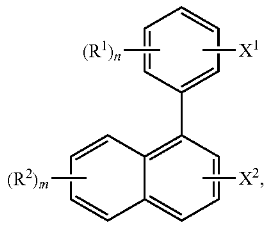

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero.

In a preferred embodiment, structures (I), (II), and (III) are structures (Ia), (IIa), and (IIIa):

(Ia)

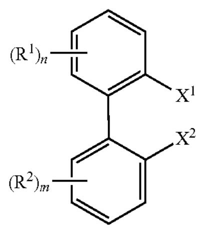

(IIa)

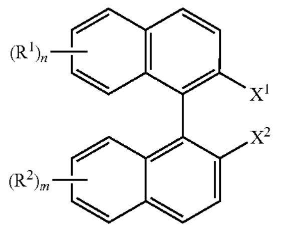

(IIIa)

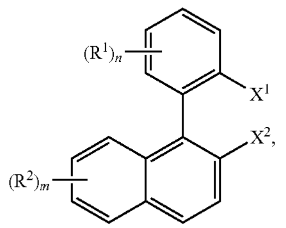

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero.

The lubricating oil compositions may contain compounds of only one of structures (I), (II), or (III). For example, the compositions may contain only a single compound of one structure type, or two or more compounds of the same structure type. Alternatively, the compositions may contain compounds of two, three or all four of structures (I), (II), or (III).

In one embodiment, the lubricating oil composition contains one or more compounds of structure (I), preferably only one compound of structure (I), and does not contain any compounds of either structure (II) or structure (III).

In one embodiment, the lubricating oil composition contains one or more compounds of structure (II), preferably only one compound of structure (II), and does not contain any compounds of either structure (I) or structure (III).

In one embodiment, the lubricating oil composition contains one or more compounds of structure (III), preferably only one compound of structure (III), and does not contain any compounds of either structure (I) or structure (II).

Preferably, the lubricating oil composition comprises 0.1 to 10 mass % of at least one of compounds of structures (I), (II), or (III), more preferably 0.5 to 10 mass %, even more preferably 1.0 to 5 mass % of at least one of compounds of structures (I), (II), or (III).

In a second aspect, the present invention provides a method of ameliorating or preventing deposits in an engine during its operation, the method comprising lubricating the engine with a lubricating oil composition according to the first aspect. Preferably, the engine is a compression-ignited engine, for example, a medium-speed, four-stroke, compression-ignited (diesel) trunk piston engine or a heavy-duty diesel engine.

In a third aspect, the present invention provides a method of dispersing asphaltenes in a trunk piston marine lubricating oil composition during its lubrication of surfaces of the combustion chamber of a compression-ignited marine engine and operation of the engine, which method comprises:

(i) providing a lubricating composition according to the first aspect;

(ii) providing the composition in the combustion chamber;

(iii) providing heavy fuel oil in the combustion chamber; and (iv) combusting the heavy fuel oil in the combustion chamber.

In a fourth aspect, the present invention provides the use of at least one compound of structures (I), (II), or (III), as defined in relation to the first aspect, as an additive in a lubricating oil composition to ameliorate or prevent deposits in an engine during its operation and when lubricated by the lubricating oil composition, wherein the at least one compound of structure (I), (II), or (III) is present in the lubricating oil composition in an amount of 0.1 to 25 mass %, based on the mass of the composition.

In a fifth aspect, the present invention provides the use of at least one compound of structures (I), (II), or (III), as defined in relation to the first aspect, as an additive in a lubricating oil composition to ameliorate or prevent deposits in an engine during its operation and when lubricated by the lubricating oil composition, wherein the at least one compound of structure (I), (II), or (III) is present in the lubricating oil composition in an amount of 0.1 to 25 mass %, based on the mass of the composition.

In preferred embodiments of the fourth and fifth aspects, structures (I), (II), and (III) are structures (Ia), (IIa), and (IIIa) as defined hereinabove.

DESCRIPTION

In this specification, the following words and expressions, if and when used, have the meanings ascribed below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof, the expressions "consists of" or "consists essentially of" or cognates may be embraced within "comprises" or cognates, wherein "consists essentially of" permits inclusion of substances not materially affecting the characteristics of the composition to which it applies;

"major amount" means in 50 mass % or more, such as in excess of 50 mass % of a composition;

"minor amount" means less than 50 mass % of a composition;

"TBN" means total base number as measured by ASTM D2896.

Furthermore in this specification:

"calcium content" is as measured by ASTM D4951;

"phosphorus content" is as measured by ASTM D5185;

"sulphated ash content" is as measured by ASTM D874;

"sulphur content" is as measured by ASTM D2622;

"KV100" means kinematic viscosity at 100° C. as measured by ASTM D445.

Also, it will be understood that various components used, essential as well as optimal and customary, may react under conditions of formulation, storage or use and that the invention also provides the product obtainable or obtained as a result of any such reaction.

Further, it is understood that any upper and lower quantity, range and ratio limits set forth herein may be independently combined.

The features of the invention, which apply equally to all aspects, will now be discussed in more detail below.

Oil of Lubricating Viscosity

The oil of lubricating viscosity may range in viscosity from light distillate mineral oils to heavy lubricating oils. Generally, the viscosity of the oil ranges from 2 to 40 $mm^2$/sec, as measured at 100° C.

Natural oils include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale also serve as useful base oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkybenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulphides and derivative, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, and the alkyl and aryl ethers of polyoxyalkylene polymers (e.g., methyl-polyiso-propylene glycol ether having a molecular weight of 1000 or diphenyl ether of polyethylene glycol having a molecular weight of 1000 to 1500); and mono- and polycarboxylic esters thereof, for example, the acetic acid esters, mixed $C_3$-$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters includes dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils comprise another useful class of synthetic lubricants; such oils include tetraethyl silicate, tetraisopropyl silicate, tetra-(2-ethylhexyl)silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly(methylphenyl)siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

Unrefined, refined and re-refined oils can be used in lubricants of the present invention. Unrefined oils are those obtained directly from a natural or synthetic source without further purification treatment. For example, a shale oil obtained directly from retorting operations; petroleum oil obtained directly from distillation; or ester oil obtained directly from an esterification and used without further treatment would be an unrefined oil. Refined oils are similar to unrefined oils except that the oil is further treated in one or more purification steps to improve one or more properties. Many such purification techniques, such as distillation, solvent extraction, acid or base extraction, filtration and percolation are known to those skilled in the art. Re-refined oils are obtained by processes similar to those used to provide refined oils but begin with oil that has already been used in service. Such re-refined oils are also known as reclaimed or reprocessed oils and are often subjected to additional processing using techniques for removing spent additives and oil breakdown products.

Definitions for the base stocks and base oils in this invention are the same as those found in the American Petroleum Institute (API) publication "Engine Oil Licensing and Certification System", Industry Services Department, Fourteenth Edition, December 1996, Addendum 1, December 1998. Said publication categorizes base stocks as follows:

a) Group I base stocks contain less than 90 percent saturates and/or greater than 0.03 percent sulphur and have a viscosity index greater than or equal to 80 and less than 120 using the test methods specified in Table E-1.

b) Group II base stocks contain greater than or equal to 90 percent saturates and less than or equal to 0.03 percent sulphur and have a viscosity index greater than or equal to 80 and less than 120 using the test methods specified in Table E-1.

c) Group III base stocks contain greater than or equal to 90 percent saturates and less than or equal to 0.03 percent sulphur and have a viscosity index greater than or equal to 120 using the test methods specified in Table E-1.

d) Group IV base stocks are polyalphaolefins (PAO).

e) Group V base stocks include all other base stocks not included in Group I, II, III, or IV.

Analytical Methods for Base Stock are tabulated below:

| PROPERTY | TEST METHOD |
|---|---|
| Saturates | ASTM D 2007 |
| Viscosity Index | ASTM D 2270 |
| Sulphur | ASTM D 2622 |
| | ASTM D 4294 |
| | ASTM D 4927 |
| | ASTM D 3120 |

As stated, the oil of lubricating viscosity preferably contains 50 mass % or more of base stock containing greater than or equal to 90% saturates and less than or equal to 0.03% sulphur or a mixture thereof: It may contain 50 mass % or more of a Group II base stock. Preferably, it contains 60, such as 70, 80 or 90, mass % or more of a Group II base stock. The oil of lubricating viscosity may be substantially all Group II base stock. Such oils are preferred because the above-mentioned problem of asphaltene precipitation is more acute at higher base stock saturate levels.

Compounds of Structures (I), (II), and (III)

The lubricating oil compositions of the present invention contain at least one of compounds of structures (I), (II), or (III):

(I)

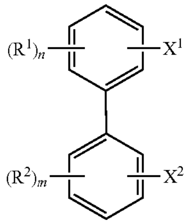

(II)

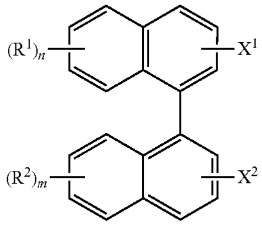

(III)

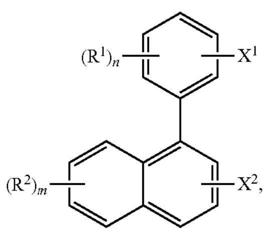

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero.

As shown in structures (I), (II), and (III), groups $R^1$, $R^2$, $X^1$ and $X^2$ may be attached at any suitable point around the respective aryl groups. However, in a preferred embodiment, specific structures (I), (II), and (III) are employed. These are structures (Ia), (IIa), and (IIIa):

(Ia)

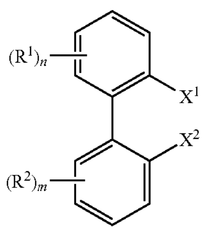

-continued (IIa)

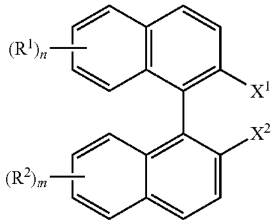

(IIIa)

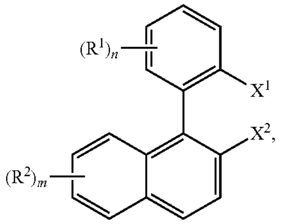

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero.

In a preferred embodiment, $X^1$ and $X^2$ are the same. More preferably, $X^1$ and $X^2$ are both OH.

At least one of the aryl groups in structures (I), (II), and (III) must be substituted so m and n cannot both simultaneously be zero. In one embodiment, only one aryl group is substituted so one of m or n is zero and the other is non-zero. Preferably in this embodiment, one of m or n is zero and the other is 1. In a preferred embodiment, both aryl groups are substituted so both m and n are an integer from 1 to 3. Preferably in this embodiment, both m and n are 1.

At least one of $R^1$ or $R^2$ must have at least 4 carbon atoms so if either m or n is zero, such that one of the aryl groups is unsubstituted (except for $X^1$ or $X^2$), then at least one substituent on the substituted aryl group must have at least 4 carbon atoms.

One or both aryl groups in structures (I), (II), and (III) may be multiply substituted when n and/or m is 2 or 3. For example, if m is 2 or 3 then one of the aryl groups will carry two or three substituents $R^1$. In this case, these groups $R^1$ may be the same or different. Similarly, if n is 2 or 3 then the other aryl group will carry two or three substituents $R^2$. Again, these groups $R^2$ may be the same or different.

The proviso that at least one of $R^1$ and $R^2$ has at least 4 carbon atoms remains. For example, if m is zero and n is 2 or 3, at least one of the 2 or 3 groups $R^1$ must have at least 4 carbon atoms. Similarly, if n is zero and m is 2 or 3, at least one of the 2 or 3 groups $R^2$ must have at least 4 carbon atoms. Further, if n and m are both 2 or 3, or if one is 2 and the other is 3, then provided that at least one of groups $R^1$ or $R^2$ has at least 4 carbon atoms, the remaining groups $R^1$ and $R^2$ may have fewer than 4 carbon atoms.

Preferably, at least one of $R^1$ and $R^2$ have from 8 to 36 carbon atoms, more preferably from 8 to 30 carbon atoms, even more preferably 8 to 24 carbon atoms, for example 8 to 18 carbon atoms.

Alternately, both of $R^1$ and $R^2$ have from 8 to 36 carbon atoms, more preferably from 8 to 30 carbon atoms, even more preferably 8 to 24 carbon atoms, for example 8 to 18 carbon atoms.

Alternately, at least one of groups $R^1$ and $R^2$ has at least 4 (such as at least 6, such as at least 8, such as at least 10, such as at least 12) carbon atoms.

Alternately, both of groups $R^1$ and $R^2$ have at least 4 (such as at least 6, such as at least 8, such as at least 10, such as at least 12) carbon atoms.

Preferably, $R^1$ and $R^2$ are the same or different and are linear or branched alkyl or alkenyl groups.

Preferably, $R^1$ and $R^2$ are the same or different and are linear or branched alkyl or alkenyl groups having from 8 to 36 carbon atoms, preferably from 8 to 30 carbon atoms, more preferably 8 to 24 carbon atoms, even more preferably 8 to 18 carbon atoms.

Preferably n and m are both 1. Preferably, $R^1$ and $R^2$ are the same.

In embodiments, $R^1$ and $R^2$ are both linear alkyl groups having 8 to 18 carbon atoms.

In embodiments, $R^1$ and $R^2$ are both branched alkyl groups having 8 to 24 carbon atoms.

In a preferred embodiment, specific structures of (Ia), (IIa), and (IIIa) are employed. These are structures (Ib), (IIb) and (IIIb):

(Ib)

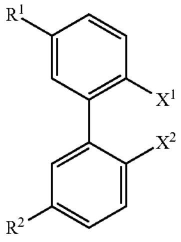

(IIb)

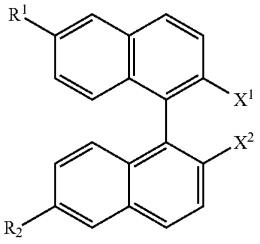

(IIIb)

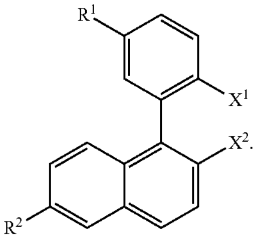

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero.

In structures (Ib), (IIb) and (IIIb), groups $X^1$ and $X^2$ are positioned at the 2 and 2' position relative to the aromatically bridged carbon of the biaryl structures. In alternative embodiments, groups $X^1$ and $X^2$ may be positioned at the 4 and 4' position relative to the aromatically bridged carbon of the biaryl structures or one of $X^1$ and $X^2$ may be in the 2 (or 2') position while the other is in the 4' (or 4) position. The alkyl groups are most preferably positioned at 5 and 5' positions on phenyl moieties and 7 and 7' positions of naphthyl moieties.

Lubricating oil compositions of the present invention may also contain mixtures of different compounds of structures (I), (II), and (III). Such mixtures may contain compounds of different general structures, more than one compound of the same general structure, or combinations of these. For example, a lubricating oil composition may contain two or more compounds of structure (I) (or (II), or (III)) which differ only in the relative positions of the groups $R^1$, $R^2$, $X^1$ and $X^2$. A specific example would be a mixture of two compounds of structure (Ib) where some molecules have groups $X^1$ and $X^2$ in the para position (relative to $R^1$ and $R^2$) and other molecules where groups $X^1$ and $X^2$ are in the ortho position (relative to $R^1$ and $R^2$). Other similar mixtures will be apparent to those skilled in the art.

In preferred embodiments $X^1$ and $X^2$ are positioned at the 2 and 2' positions relative to the aromatically bridged carbon of the biaryl structures. More preferably in compounds of structures (I), $X^1$ and $X^2$ are positioned at the 2 and 2' positions relative to the aromatically bridged carbon of the biaryl structures. (Formula Ia shows $X^1$ and $X^2$ in the 2 and 2' positions).

Alternately in preferred embodiments at least one of $X^1$ and $X^2$ is located at the 2 or 2' position, more preferably in compounds of structures (I) at least one of $X^1$ and $X^2$ is located at the 2 or 2' position.

In preferred embodiments, the present invention provides a lubricating oil composition comprising 50 mass % or more of an oil of lubricating viscosity and 0.1 to 25 mass % (such as 0.1 to 10 mass %, such as 0.5 to 10 mass %, such as 1.0 to 5 mass %) of a compound of the structure:

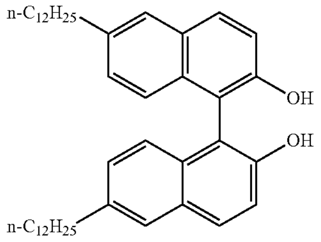

where the groups n-$C_{12}H_{25}$ represent (normal) linear alkyl groups.

In another preferred embodiment, the present invention provides a lubricating oil composition comprising 50 mass % or more of an oil of lubricating viscosity and 0.1 to 25 mass % (such as 0.1 to 10 mass %, such as 0.5 to 10 mass %, such as 1.0 to 5 mass %) of a compound of the structure:

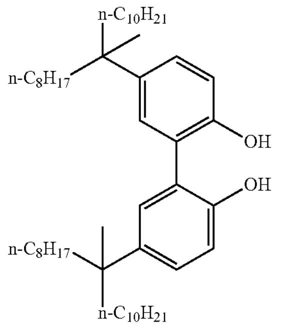

where the groups $n-C_8H_{17}$ and $n-C_{10}H_{21}$ represent (normal) linear alkyl groups.

In another preferred embodiment, the present invention provides a lubricating oil composition comprising 50 mass % or more of an oil of lubricating viscosity and 0.1 to 25 mass % (such as 0.1 to 10 mass %, such as 0.5 to 10 mass %, such as 1.0 to 5 mass %) of a compound of the structure:

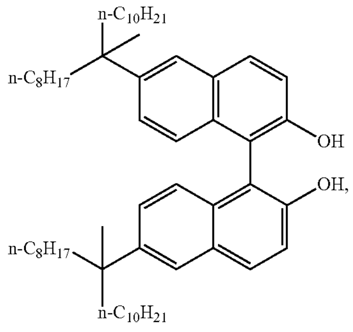

where the groups $n-C_{10}H_{21}$ and $n-C_8H_{17}$ represent (normal) linear alkyl groups.

In another preferred embodiment, the present invention provides a lubricating oil composition comprising 50 mass % or more of an oil of lubricating viscosity and 0.1 to 25 mass % (such as 0.1 to 10 mass %, such as 0.5 to 10 mass %, such as 1.0 to 5 mass %) of a compound of the structure:

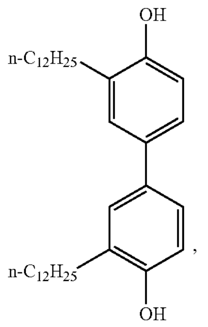

where the groups $n-C_{12}H_{25}$ represent (normal) linear alkyl groups.

The lubricating oil composition comprises 0.1 to 25 mass % of at least one of compounds of structures (I), (II,) or (III) (such as compounds of structures (Ia), (IIa), (IIIa), (Ib), (IIb), and (IIIb)), preferably the lubricating oil composition comprises 0.1 to 10 mass % of at least one of compounds of structures (I), (II), or (III) (such as compounds of structures (Ia), (IIa), (IIIa), (Ib), (IIb), and (IIIb)), more preferably the lubricating oil composition comprises 0.5 to 10 mass %, even more preferably 1.0 to 5 mass % of at least one of compounds of structures (I), (II), or (III) (such as compounds of structures (Ia), (IIa), (IIIa), (Ib), (IIb), and (IIIb)).

In embodiments, the compounds of structures (I), (II), or (III) do not comprise (preferably are not) 4,4'-dihydroxy-3,3',5,5'-tetra-tert-butylbiphenyl.

In embodiments, the compounds of structures (I) do not comprise (preferably are not) 4,4'-dihydroxy-3,3',5,5'-tetra-tert-butylbiphenyl.

In embodiments, the compounds of structures (I), (II), or (III), $X^1$ and $X^2$ are —OH and are positioned at the 2 and 2' positions relative to the aromatically bridged carbon of the biaryl structures.

Further Additives for Use in the Compositions

Preferably, the lubricating oil compositions of the present invention further comprise 0.1 to 25 mass % of at least one metal-containing detergent compound (herein also referred to as a metal detergent, or simply a detergent), based on the mass of the composition. More preferably the lubricating oil composition comprises 1 to 20 mass % of at least one metal-containing detergent compound, such as 2 to 20 mass %, or 3 to 18 mass %, for example from 4 to 15 mass %.

A detergent is an additive that reduces formation of piston deposits, for example high-temperature varnish and lacquer deposits in engines; it normally has acid-neutralising properties and is capable of keeping finely-divided solids in suspension. Most detergents are based on metal "soaps", that is metal salts of acidic organic compounds.

Detergents generally comprise a polar head with a long hydrophobic tail, the polar head comprising the metal salt of the acidic organic compound. The salts may contain a substantially stoichiometric amount of the metal when they are usually described as normal or neutral salts and would typically have a total base number or TBN at 100% active mass (as may be measured by ASTM D2896) of from 0 to 80. Large amounts of a metal base can be included by reaction of an excess of a metal compound, such as an oxide or hydroxide, with an acidic gas such as carbon dioxide.

The basicity of metal detergents may be expressed as a total base number (TBN) expressed in units of mgKOH/g. A total base number is the amount of acid needed to neutralize all of the basicity of the overbased material. The TBN may be measured using ASTM standard D2896 or an equivalent procedure. The metal detergent may have a low TBN (i.e. a TBN of less than 50), a medium TBN (i.e. a TBN of 50 to 150) or a high TBN (i.e. a TBN of greater than 150, such as 150-500).

In the present invention, and when present, preferably the metal-containing detergent has a TBN, as measured using ASTM standard D2896 of greater than 150 mgKOH/g, such as from 150-500 mgKOH/g.

Suitably, detergents that may be used include oil-soluble neutral and overbased sulfonates, phenates, sulfurised phenates, thiophosphonates, hydroxybenzoates and salicylates, and naphthenates and other oil-soluble carboxylates of a metal, particularly alkali metal or alkaline earth metals, e.g., Na, K, Li, Ca and Mg. The most commonly used metals are Ca and Mg, which may both be present in detergents used in lubricating compositions, and mixtures of Ca and/or Mg with Na. Detergents may be used in various combinations. Calcium is preferred.

In one embodiment of the present invention, and when used, the metal-containing detergent compound is a metal hydrocarbyl-substituted hydroxybenzoate, preferably a hydrocarbyl-substituted salicylate. Preferably, the metal-containing detergent is an overbased metal hydrocarbyl-substituted hydroxybenzoate, preferably an overbased metal hydrocarbyl-substituted salicylate.

Overbased metal hydrocarbyl-substituted hydroxybenzoates typically have the structure shown:

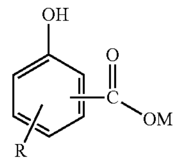

wherein R is a linear or branched aliphatic hydrocarbyl group, and more preferably an alkyl group, including straight- or branched-chain alkyl groups. There may be more than one R group attached to the benzene ring. M is an alkali metal (e.g., lithium, sodium or potassium) or alkaline earth metal (e.g., calcium, magnesium barium or strontium). Calcium or magnesium are preferred with calcium being especially preferred. The COOM group can be in the ortho, meta or para position with respect to the hydroxyl group; the ortho position is preferred. The R group can be in the ortho, meta or para position with respect to the hydroxyl group. When M is divalent, it represents 'half' an atom in the above formula.

Hydroxybenzoic acids are typically prepared by the carboxylation, by the Kolbe-Schmitt process, of phenoxides, and in that case, will generally be obtained (normally in a diluent) in admixture with uncarboxylated phenol. Hydroxybenzoic acids may be non-sulphurized or sulphurized, and may be chemically modified and/or contain additional substituents. Processes for sulphurizing a hydrocarbyl-substituted hydroxybenzoic acid are well known to those skilled in the art, and are described, for example, in US 2007/0027057.

In hydrocarbyl-substituted hydroxybenzoic acids, the hydrocarbyl group is preferably alkyl (including straight- or branched-chain alkyl groups), and the alkyl groups advantageously contain 5 to 100, preferably 9 to 30, especially 14 to 24, carbon atoms.

The term "overbased" is generally used to describe metal detergents in which the ratio of the number of equivalents of the metal moiety to the number of equivalents of the acid moiety is greater than one. The term 'low-based' is used to describe metal detergents in which the equivalent ratio of metal moiety to acid moiety is greater than 1, and up to about 2.

Preferably, the overbased metal detergent is one where the metal cations of the oil-insoluble metal salt are essentially calcium cations. Small amounts of other cations may be present in the oil-insoluble metal salt, but typically at least 80, more typically at least 90, for example at least 95, mole % of the cations in the oil-insoluble metal salt, are calcium ions. Cations other than calcium may be derived, for example, from the use in the manufacture of the overbased detergent of a surfactant salt in which the cation is a metal other than calcium. Preferably, the metal salt of the surfactant is also calcium.

In a preferred embodiment, the lubricating oil composition comprises an overbased calcium hydrocarbyl-substituted hydroxybenzoate, preferably an overbased calcium hydrocarbyl-substituted salicylate.

Overbased metal hydrocarbyl-substituted hydroxybenzoates can be prepared by any of the techniques employed in the art. A general method is as follows:

1. Neutralisation of hydrocarbyl-substituted hydroxybenzoic acid with a molar excess of metallic base to produce a slightly overbased metal hydrocarbyl-substituted hydroxybenzoate complex, in a solvent mixture consisting of a volatile hydrocarbon, an alcohol and water;
2. Carbonation to produce colloidally-dispersed metal carbonate followed by a post-reaction period;
3. Removal of residual solids that are not colloidally dispersed; and
4. Stripping to remove process solvents.

Overbased metal hydrocarbyl-substituted hydroxybenzoates can be made by either a batch or a continuous overbasing process.

Metal base (e.g., metal hydroxide, metal oxide or metal alkoxide), preferably lime (calcium hydroxide), may be charged in one or more stages. The charges may be equal or may differ, as may the carbon dioxide charges which follow them. When adding a further calcium hydroxide charge, the carbon dioxide treatment of the previous stage need not be complete. As carbonation proceeds, dissolved hydroxide is converted into colloidal carbonate particles dispersed in the mixture of volatile hydrocarbon solvent and non-volatile hydrocarbon oil.

Carbonation may be effected in one or more stages over a range of temperatures up to the reflux temperature of the alcohol promoters. Addition temperatures may be similar, or different, or may vary during each addition stage. Phases in which temperatures are raised, and optionally then reduced, may precede further carbonation steps.

The volatile hydrocarbon solvent of the reaction mixture is preferably a normally liquid aromatic hydrocarbon having a boiling point not greater than about 150° C. Aromatic hydrocarbons have been found to offer certain benefits, e.g., improved filtration rates, and examples of suitable solvents are toluene, xylene, and ethyl benzene.

The alkanol is preferably methanol although other alcohols such as ethanol can be used. Correct choice of the ratio of alkanol to hydrocarbon solvents, and the water content of the initial reaction mixture, are important to obtain the desired product.

Oil may be added to the reaction mixture; if so, suitable oils include hydrocarbon oils, particularly those of mineral origin. Oils which have viscosities of 15 to 30 $mm^2$/sec at 38° C. are very suitable.

After the final treatment with carbon dioxide, the reaction mixture is typically heated to an elevated temperature, e.g., above 130° C., to remove volatile materials (water and any remaining alkanol and hydrocarbon solvent). When the synthesis is complete, the raw product is hazy because of the presence of suspended sediments. It is clarified by, for example, filtration or centrifugation. These measures may be used before, or at an intermediate point, or after solvent removal.

The products are generally used as an oil solution. If the reaction mixture contains insufficient oil to retain an oil solution after removal of the volatiles, further oil should be added. This may occur before, or at an intermediate point, or after solvent removal.

The lubricating oil compositions of the invention may comprise further additives, different from, and additional to, the compounds of structures (I), (II), and (III), and any metal-containing detergent. Such additional additives are well known the art and may, for example, include one or more phosphorus-containing compounds; oxidation inhibitors or anti-oxidants; dispersants; anti-wear agents; friction modifiers, viscosity modifiers and other co-additives. These will be discussed in more detail below.

Suitable phosphorus-containing compounds include dihydrocarbyl dithiophosphate metal salts, which are frequently used as antiwear and antioxidant agents. The metal is preferably zinc, but may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 mass %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$, and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

The preferred zinc dihydrocarbyl dithiophosphates are oil-soluble salts of dihydrocarbyl dithiophosphoric acids and may be represented by the following formula:

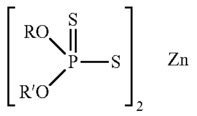

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e. R and R') in the dithiophosphoric acid will generally be 5 or greater. The zinc dihydrocarbyl dithiophosphate (ZDDP) can therefore comprise zinc dialkyl dithiophosphates. Lubricating oil compositions of the present invention suitably may have a phosphorus content of no greater than about 0.08 mass % (800 ppm). Preferably, in the practice of the present invention, ZDDP is used in an amount close or equal to the maximum amount allowed, preferably in an amount that provides a phosphorus content within 100 ppm of the maximum allowable amount of phosphorus. Thus, lubricating oil compositions useful in the practice of the present invention preferably contain ZDDP or other zinc-phosphorus compounds, in an amount introducing from 0.01 to 0.08 mass % of phosphorus, such as from 0.04 to 0.08 mass % of phosphorus, preferably, from 0.05 to 0.08 mass % of phosphorus, based on the total mass of the lubricating oil composition.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons or esters, phosphorous esters, metal thiocarbamates, oil soluble copper compounds as described in U.S. Pat. No. 4,867,890, and molybdenum-containing compounds.

Aromatic amines having at least two aromatic groups attached directly to the nitrogen constitute another class of compounds that is frequently used for antioxidancy. Typical oil-soluble aromatic amines having at least two aromatic groups attached directly to one amine nitrogen contain from 6 to 16 carbon atoms. The amines may contain more than two aromatic groups. Compounds having a total of at least three aromatic groups in which two aromatic groups are linked by a covalent bond or by an atom or group (e.g., an oxygen or sulfur atom, or a —CO—, —$SO_2$— or alkylene group) and two are directly attached to one amine nitrogen are also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups. The amount of any such oil soluble aromatic amines having at least two aromatic groups attached directly to one amine nitrogen should preferably not exceed 0.4 mass %.

A dispersant is an additive whose primary function is to hold solid and liquid contaminations in suspension, thereby passivating them and reducing engine deposits at the same time as reducing sludge depositions. For example, a dispersant maintains in suspension oil-insoluble substances that result from oxidation during use of the lubricant, thus preventing sludge flocculation and precipitation or deposition on metal parts of the engine.

Dispersants in this invention are preferably “ashless”, as mentioned above, being non-metallic organic materials that form substantially no ash on combustion, in contrast to metal-containing and hence ash-forming materials. They comprise a long hydrocarbon chain with a polar head, the polarity being derived from inclusion of e.g., an O, P, or N atom. The hydrocarbon is an oleophilic group that confers oil-solubility, having, for example 40 to 500 carbon atoms. Thus, ashless dispersants may comprise an oil-soluble polymeric backbone.

A preferred class of olefin polymers is constituted by polybutenes, specifically polyisobutenes (PIB) or poly-n-butenes, such as may be prepared by polymerization of a $C_4$ refinery stream.

Dispersants include, for example, derivatives of long chain hydrocarbon-substituted carboxylic acids, examples being derivatives of high molecular weight hydrocarbyl-substituted succinic acid. A noteworthy group of dispersants is constituted by hydrocarbon-substituted succinimides, made, for example, by reacting the above acids (or derivatives) with a nitrogen-containing compound, advantageously a polyalkylene polyamine, such as a polyethylene polyamine. Particularly preferred are the reaction products of polyalkylene polyamines with alkenyl succinic anhydrides, such as described in U.S. Pat. No. 3,202,678; 3,154,560; 3,172,892; 3,024,195; 3,024,237, 3,219,666; and 3,216,936, that may be post-treated to improve their properties, such as borated (as described in U.S. Pat. Nos. 3,087,936 and 3,254,025), fluorinated or oxylated. For example, boration may be accomplished by treating an acyl nitrogen-containing dispersant with a boron compound selected from boron oxide, boron halides, boron acids and esters of boron acids.

Preferably, the dispersant, if present, is a succinimide-dispersant derived from a polyisobutene of number average molecular weight in the range of 1000 to 3000 g/mol, preferably 1500 to 2500 g/mol, and of moderate functionality. The succinimide is preferably derived from highly reactive polyisobutene.

Another example of dispersant type that may be used is a linked aromatic compound such as described in EP-A-2 090 642.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; and alkoxylated alkyl-substituted mono-amines, diamines and alkyl ether amines, for example, ethoxylated tallow amine and ethoxylated tallow ether amine.

Other known friction modifiers comprise oil-soluble organo-molybdenum compounds. Such organo-molybdenum friction modifiers also provide antioxidant and antiwear credits to a lubricating oil composition. Examples of such oil-soluble organo-molybdenum compounds include dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Additionally, the molybdenum compound may be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkali metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds.

Among the molybdenum compounds useful in the compositions of this invention are organo-molybdenum compounds of the formulae:

$Mo(R''OCS_2)_4$ and $Mo(R''SCS_2)_4$ wherein R" is an organo group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

Another group of organo-molybdenum compounds useful in the lubricating compositions of this invention are trinuclear molybdenum compounds, especially those of the formula $Mo_3S_kA_nD_z$ and mixtures thereof wherein the A are independently selected ligands having organo groups with a sufficient number of carbon atoms to render the compound soluble or dispersible in the oil, n is from 1 to 4, k varies from 4 to 7, D is selected from the group of neutral electron donating compounds such as water, amines, alcohols, phosphines, and ethers, and z ranges from 0 to 5 and includes non-stoichiometric values. At least 21 carbon atoms should be present among all the ligand organo groups, such as at least 25, at least 30, or at least 35, carbon atoms.

Lubricating oil compositions useful in all aspects of the present invention may contain at least 10 ppm, at least 30 ppm, at least 40 ppm and more preferably at least 50 ppm molybdenum. Suitably, lubricating oil compositions useful in all aspects of the present invention may contain no more than 1000 ppm, no more than 750 ppm or no more than 500 ppm of molybdenum. Lubricating oil compositions useful in all aspects of the present invention may contain from 10 to 1000, such as 30 to 750 or 40 to 500, ppm of molybdenum (measured as atoms of molybdenum).

The viscosity index of the base stock is increased, or improved, by incorporating therein certain polymeric materials that function as viscosity modifiers (VM) or viscosity index improvers (VII). Generally, polymeric materials useful as viscosity modifiers are those having number average molecular weights (Mn) of from 5,000 to 250,000, preferably from 15,000 to 200,000, more preferably from 20,000 to 150,000. These viscosity modifiers can be grafted with grafting materials such as, for example, maleic anhydride, and the grafted material can be reacted with, for example, amines, amides, nitrogen-containing heterocyclic compounds or alcohol, to form multifunctional viscosity modifiers (dispersant-viscosity modifiers).

Polymers prepared with diolefins will contain ethylenic unsaturation, and such polymers are preferably hydrogenated. When the polymer is hydrogenated, the hydrogenation may be accomplished using any of the techniques known in the prior art. For example, the hydrogenation may be accomplished such that both ethylenic and aromatic unsaturation is converted (saturated) using methods such as those taught, for example, in U.S. Pat. Nos. 3,113,986 and 3,700,633 or the hydrogenation may be accomplished selectively such that a significant portion of the ethylenic unsaturation is converted while little or no aromatic unsaturation is converted as taught, for example, in U.S. Pat. Nos. 3,634,595; 3,670,054; 3,700,633 and U.S. Reissue Re 27,145. Any of these methods can also be used to hydrogenate polymers containing only ethylenic unsaturation and which are free of aromatic unsaturation.

Pour point depressants (PPD), otherwise known as lube oil flow improvers (LOFIs) lower the lowest temperature at which the lube flows. Compared to VM, LOFIs generally have a lower number average molecular weight. Like VM, LOFIs can be grafted with grafting materials such as, for example, maleic anhydride, and the grafted material can be reacted with, for example, amines, amides, nitrogen-containing heterocyclic compounds or alcohol, to form multifunctional additives.

When lubricating oil compositions contain one or more of the above-mentioned additives, each additive is typically blended into the base oil in an amount that enables the additive to provide its desired function. Representative effective amounts of such additives, typically when used in crankcase lubricants, are listed below. All the values listed (with the exception of detergent values since the detergents are used in the form of colloidal dispersants in an oil) are stated as mass percent active ingredient (A.I.).

| ADDITIVE | MASS % | MASS % |
|---|---|---|
| Dispersant | 0.1-20 | 1-8 |
| Metal Detergents | 0.1-15 | 0.2-9 |
| Corrosion Inhibitor | 0-5 | 0-1.5 |
| Metal dihydrocarbyl dithiophosphate | 0.1-6 | 0.1-4 |

-continued

| ADDITIVE | MASS % | MASS % |
|---|---|---|
| Antioxidant | 0-5 | 0.01-2.5 |
| Pour Point Depressant | 0.01-5 | 0.01-1.5 |
| Antifoaming Agent | 0-5 | 0.001-0.15 |
| Supplemental Antiwear Agents | 0-1.0 | 0-0.5 |
| Friction Modifier | 0-5 | 0-1.5 |
| Viscosity Modifier | 0.01-10 | 0.25-3 |
| Base stock | Balance | Balance |

Preferably, the Noack volatility of the fully formulated lubricating oil composition (oil of lubricating viscosity plus all additives) is no greater than 18, such as no greater than 14, preferably no greater than 10, mass %. Lubricating oil compositions useful in the practice of the present invention may have an overall sulfated ash content of from 0.5 to 2.0, such as from 0.7 to 1.4, preferably from 0.6 to 1.2, mass %.

It may be desirable, although not essential, to prepare one or more additive concentrates comprising additives (concentrates sometimes being referred to as additive packages) whereby several additives can be added simultaneously to the oil to form the lubricating oil composition.

This invention further relates to:

1. A lubricating oil composition comprising 50 mass % or more of an oil of lubricating viscosity and 0.1 to 25 mass % (such as 0.1 to 10 mass %, such as 0.5 to 10 mass %, such as 1.0 to 5 mass %) of at least one of compounds of structures (I), (II), or (III):

(I)

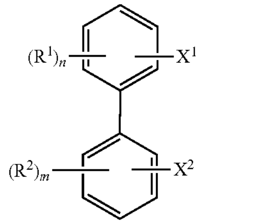

(II)

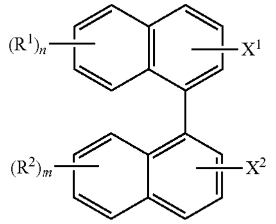

(III)

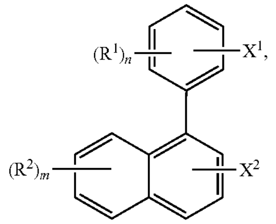

wherein X and X are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero.

2. A composition according to paragraph 1 wherein structures (I), (II), and (III) are structures (Ia), (IIa), and (IIIa):

(Ia)

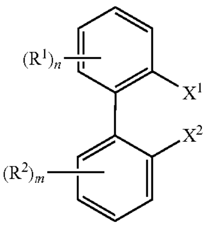

(IIa)

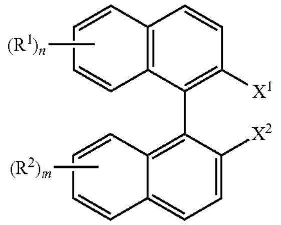

(IIIa)

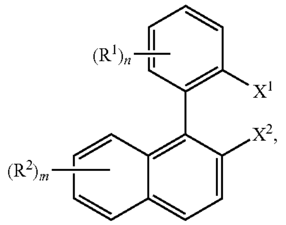

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero.

3. A composition according to paragraph 1 or 2 wherein $X^1$ and $X^2$ are both OH.

4. A composition according to paragraph 1, 2, or 3 wherein m and n are both 1.

5. A composition according to paragraph 1, 2, 3 or 4 wherein $R^1$ and $R^2$ are the same or different and are linear or branched alkyl or alkenyl groups having from 4 to 36 carbon atoms.

6. A composition according to paragraph 1, 2, 3, 4, or 5 wherein $R^1$ and $R^2$ are the same.

7. A composition according to paragraph 1, 2, 3, 4, 5, or 6 wherein $R^1$ and $R^2$ are both linear alkyl groups having 8 to 18 carbon atoms.

8. A composition according to paragraph 1, 2, 3, 4, 5, or 6 wherein $R^1$ and $R^2$ are both branched alkyl groups having 8 to 24 carbon atoms.

9. A composition according to paragraph 1, 2, 3, 4, 5, 6, 7, or 8 further comprising 0.1 to 25 mass % of at least one metal-containing detergent compound.

10. A method of ameliorating or preventing deposits in an engine during its operation, the method comprising lubricating the engine with a lubricating oil composition according to paragraph 1, 2, 3, 4, 5, 6, 7, 8, or 9.

11. A method according to claim 10 wherein the engine is a compression-ignited engine.

12. A method of dispersing asphaltenes in a trunk piston marine lubricating oil composition during its lubrication of surfaces of the combustion chamber of a compression-ignited marine engine and operation of the engine, which method comprises (i) providing a lubricating composition of paragraph 1, 2, 3, 4, 5, 6, 7, 8, or 9;

(ii) providing the composition in the combustion chamber;

(iii) providing heavy fuel oil in the combustion chamber; and (iv) combusting the heavy fuel oil in the combustion chamber.

13. The use of at least one compound of structures (I), (II), or (III):

(I)

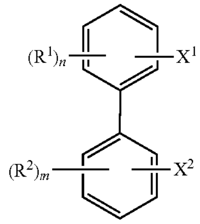

(II)

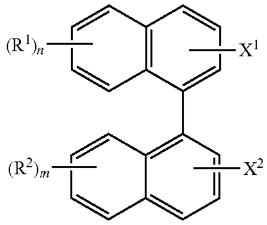

(III)

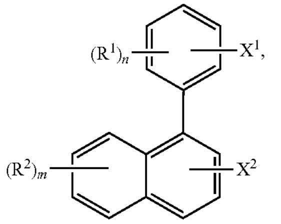

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero, as an additive in a lubricating oil composition to ameliorate or prevent deposits in an engine during its operation and when lubricated by the lubricating oil composition, wherein the at least one compound of structure (I), (II), or (III) is present in the lubricating oil composition in an amount of 0.1 to 25 mass % (such as 0.1 to 10 mass %, such as 0.5 to 10 mass %, such as 1.0 to 5 mass %), based on the mass of the composition.

14. The use of at least one compound of structures (I), (II), or (III):

(I)

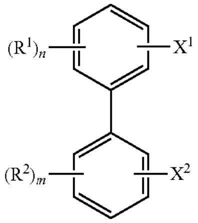

(II)

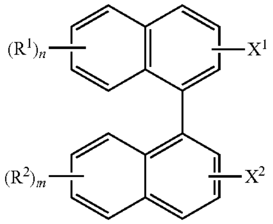

(III)

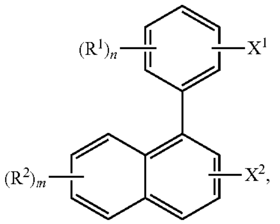

wherein $X^1$ and $X^2$ are the same or different and are OH, $NH_2$ or SH; wherein $R^1$ and $R^2$ are the same or different and are linear or branched, saturated or unsaturated hydrocarbon groups having from 1 to 50 carbon atoms, with the proviso that at least one of $R^1$ and $R^2$ has at least 4 carbon atoms; wherein m and n are the same or different and are zero or an integer from 1 to 3 with the proviso that m and n are not both zero, as an additive in a trunk piston marine lubricating oil to disperse asphaltenes in the trunk piston marine lubricating oil composition during its lubrication of surfaces of the combustion chamber of a compression-ignited marine engine operated by combusting a heavy fuel oil.

15. A use according to paragraph 13 or 14 wherein structures (I), (II), and (III) are structures (Ia), (IIa), and (IIIa):

(Ia)

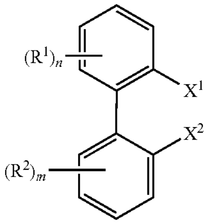

-continued (IIa)

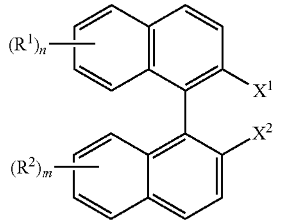

(IIIa)

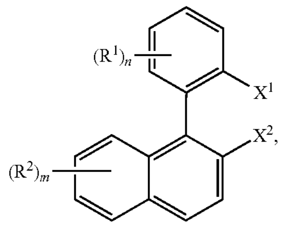

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero.

16. A composition comprising less than 50 mass % (such as 0.1 to 30 mass %, such as 0.1 to 30 mass %, such as 0.5 to 20 mass %, such as 1.0 to 10 mass %) of an oil of lubricating viscosity and 0.1 to 25 mass % (such as 0.1 to 10 mass %, such as 0.5 to 10 mass %, such as 1.0 to 5 mass %) of at least one of compounds of structures (I), (II), or (III):

(I)

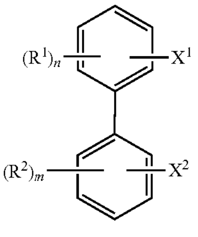

(II)

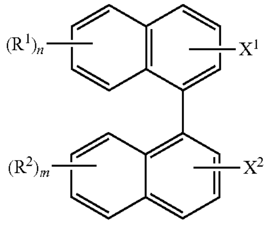

-continued (III)

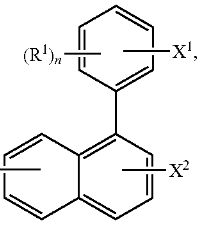

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero.

17. A composition according to paragraph 16 wherein structures (I), (II), and (III) are structures (Ia), (IIa), and (IIIa):

(Ia)

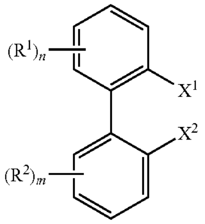

(IIa)

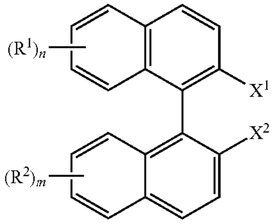

(IIIa)

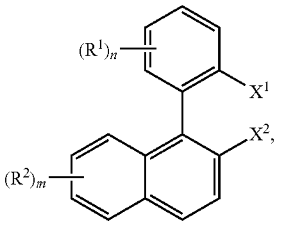

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero.

18. A composition according to paragraph 16 or 17 wherein $X^1$ and $X^2$ are both OH.

19. A composition according to paragraph 16, 17, or 18 wherein m and n are both 1.

20. A composition according to paragraph 16, 17, 18 or 19 wherein $R^1$ and $R^2$ are the same or different and are linear or branched alkyl or alkenyl groups having from 4 to 36 carbon atoms.

21. A composition according to paragraph 16, 17, 18, 19, or 20 wherein $R^1$ and $R^2$ are the same.

22. A composition according to paragraph 16, 17, 18, 19, 20, or 21 wherein $R^1$ and $R^2$ are both linear alkyl groups having 8 to 18 carbon atoms.

23. A composition according to paragraph 16, 17, 18, 19, 20, or 22 wherein $R^1$ and $R^2$ are both branched alkyl groups having 8 to 24 carbon atoms.

24. A composition according to paragraph 16, 17, 18, 19, 20, 21, 22, or 23 further comprising 0.1 to 25 mass % of at least one metal-containing detergent compound.

EXAMPLES

The present invention is illustrated by, but not limited to, the following examples.

The compounds in the following Table were synthesized.

| | |
|---|---|
| A | 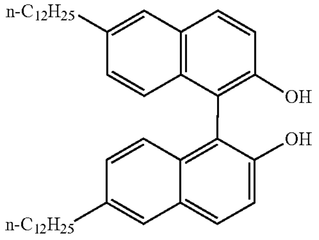 |
| B | 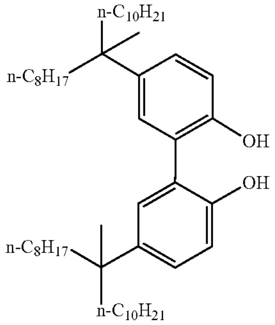 |
| C | 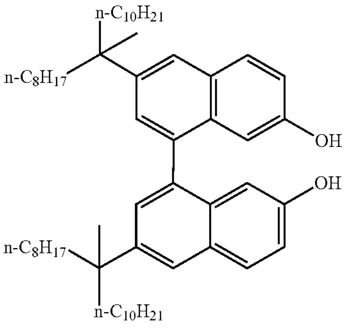 |

-continued

| | |
|---|---|
| D | 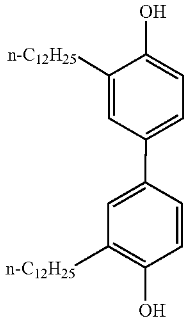 |
| E | 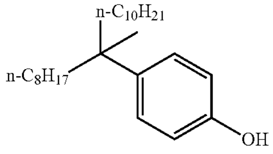 |
| F | 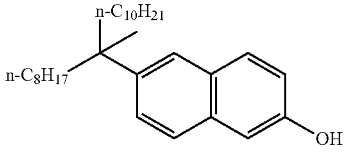 |

Compounds A, B, C and D are examples of compounds on structures (I) and (II) as defined herein. Compounds E and F are not according to the present invention and are included by way of comparison.

Synthesis of Example Compounds

Compound A

Step 1—6,6'-dibromo-[1,1'-binapthalene]-2,2'-diol

To a solution of 1,1'-bi-2-naphthol (750 g) in dichloromethane (7.5 L) at −70° C., is added as solution of bromine (1151 g) in dichloromethane (2.25 L) over 3.5 hours. The mixture is stirred for 3 hours at −65° C. and slowly warmed to room temperature. Solid removed by filtration and washed with dichloromethane (2×2.5 L), dried on filter and then further dried under vacuum at 30° C. to give 6,6'-dibromo-[1,1'-binapthalene]-2,2'-diol, (1.73 Kg), HPLC: 95.9%.

Step 2—6,6'-dibromo-2,2'-dimethoxy-1,1'-binapthalene

To a solution of 6,6'-dibromo-[1,1'-binapthalene]-2,2'-diol (1725 g) in tetrahydrofuran (5.2 L) at 0-5° C. is added a solution of sodium hydroxide (590 g) dissolved in water (1.77 L), maintaining temperature <10° C. Methyl iodide (2094 g) is added over 3 hours, maintaining temperature <5° C. and then warmed to room temperature and stirred for 16 hours. Water (5.2 L) is added and the resultant solids collected by filtration washing with water (5.2 L) and methanol (5.2 L), dried under vacuum at 40° C. Yield 1.73 Kg (94%), HPLC: 95.6%

Step 3—6,6'-Di-n-Dodecyl-2-2'-dimethoxy-1-1'-binaphthalene

To a suspension of magnesium turnings (244 g) in dry tetrahydrofuran (1 L) is added 1-bromo-n-dodecane (80 g), once initiation n observed, dry tetrahydrofuran (7 L) is added. 1-Bromo-n-dodecane (1920 g) is added over 1 hour maintaining temperature <40° C. Product solution decanted away from excess magnesium.

To a solution of 6,6'-dibromo-2,2'-dimethoxy-1,1'-binapthalene (275 g) in tetrahydrofuran (9.3 L) is added 1,1'-bis(diphenylphosphino)ferrocene palladium (II) dichloride (23.8 g), cooled to <5° C. n-Dodecyl magnesium bromide (4.2 eq) is added over 2 hours at temperature <5° C. The solution is then heated to reflux for 3 hours and allowed to slowly cool overnight. A solution of ammonium chloride (657 g) in water (2.75 L) is added at temperature <20° C. Layer separated and aqueous layer extracted with ethyl acetate (1.1 L). Combined organic layers washed with 20% brine, then dried with anhydrous sodium sulfate, filtered and filtrate concentrated under vacuum at 60° C. Crude oil poured into stirring methanol (963 mL), resultant solid collected by filtration, washed with methanol (2×275 mL). Recrystallised from methanol. Yield 379 g (100%).

Step 4—6,6'-Di-n-dodecyl-2,2'-dihydroxy-1-1'-bi-naphthalene

To mixture of 6,6'-Di-n-Dodecyl-2-2'-dimethoxy-1-1'-binaphthalene (1176 g) acetic acid (5.3 L) and 48% hydrobromic acid (5.3 L) is refluxed for 5 days. Cooled to room temperature and hexane (2.25 L) is added and quenched into water (21 L). Hexane (6.5 L) is added and filtered. Aqueous layer extracted with hexane (2×2.6 L). Organic layer is washed with brine (2×4.25 L), treated with sodium carbonate (540 g), dried with anhydrous sodium sulfate, filtered and concentrated at 60° C. under vacuum, to yield waxy product (1.86 kg, 82%).

$^1$H NMR (300 MHz, CHLOROFORM-d) δ ppm 0.75-0.87 (m, 7H) 1.12-1.27 (m, 38H) 1.40-1.74 (m, 4H) 2.56-2.70 (m, 4H) 6.96-7.11 (m, 4H) 7.26 (d, J=8.88 Hz, 2H) 7.57 (s, 2H) 7.81 (d, J=8.88 Hz, 2H).

Compound B

To a suspension of 2,2'-Biphenol (50.3 g) and montmorillonite K10 (12.2 g) in heptane (250 mL) is heated to 70° C., umPOA C10 Dimer (100 g) is added over 3 hours. Sulfuric acid (0.5 mL) is added and a further portion of umPOA C10 Dimer (66 g) is added over 1 hour. Reaction left at 70° C. for 16 hours and then a further portion of umPOA C10 Dimer (29 g) added and temperature increased to 90° C. for 1 hour. Cooled to room temperature, filtered and concentrated at 75° C. under vacuum. Crude product purified using silica gel plug, washing with heptane and then ethyl acetate. The ethyl acetate solution concentrated at 60° C. under vacuum and then dried at 120° C. under vacuum to yield product as a viscous oil—107 g, 57%. HPLC: 70% di, 30% mono.

$^1$H NMR (300 MHz, CHLOROFORM-d) δ ppm 0.79 (td, J=6.77, 3.26 Hz, 14H) 0.89-1.06 (m, 6H) 1.08-1.22 (m, 60H) 1.28 (br s, 1H) 1.33-1.49 (m, 5H) 1.49-1.65 (m, 5H) 5.66 (br s, 2H) 6.87 (d, J=8.50 Hz, 2H) 6.90-6.98 (m, 1H) 7.07 (d, J=2.27 Hz, 2H) 7.09-7.20 (m, 2H).

$^{13}$C NMR (75 MHz, CHLOROFORM-d) δ ppm 14.14 (s, 1 C) 22.70 (s, 1 C) 22.72 (s, 1 C) 24.32 (s, 1 C) 24.40 (s, 1 C) 29.39 (s, 1 C) 29.40 (s, 1 C) 29.62 (s, 1 C) 29.67 (s, 1 C) 29.75 (s, 1 C) 30.53 (s, 1 C) 31.93 (s, 1 C) 31.96 (s, 1 C) 40.32 (s, 1 C) 43.34 (s, 1 C) 116.08 (s, 1 C) 123.75 (s, 1 C) 127.72 (s, 1 C) 129.44 (s, 1 C) 141.71 (s, 1 C) 150.19 (s, 1 C).

Compound C

To a suspension of copper (II) chloride (22.16 g) and propan-2-ol (660 ml) at room temperature, cyclohexanamine (81 ml) is added and stirred for 15 minutes. A solution of 6-(9-methylnonadecan-9-yl)naphthalen-2-ol (102.49 g) in propan-2-ol (440 mL) is added and stirred for 2.5 hours. The reaction mixture diluted with heptane (700 mL) and 2M hydrochloric acid (1.3 L) added. Layers separated and organic layer washed with 3×250 mL 2M hydrochloric acid, 3×200 mL ammonium chloride, and 2×250 mL Brine. The organic layer dried with magnesium sulfate, filtered and the filtrate concentrated under vacuum to give a brown oil—102 g.

$^1$H NMR (300 MHz, CHLOROFORM-d) δ ppm 7.9 (d, 2H) 7.7 (s, 2H), 7.35 (m, 4H) 7.2 d, 2H), 5.0 (s, 2H), 2.0-1.2 (m, 42).

Compound D

To a solution of [1,1'-biphenyl]-4,4'-diol (50 g) in triflic acid (189 mL) at 60° C., dodecanoyl chloride (137 mL) is added over 1 hour. Reaction is maintained at 60° C. for 3 hours. Upon completion, the reaction is cooled to room temperature. The mixture is diluted with water (3 L) to yield a beige solid which was collected by filtration. The solid was washed with water (2×500 mL) and acetonitrile (600 ml then 2×150 mL). The resulting solids are dried under vacuum to give a tan powder, (148 g, 100%).

To a solution of the tan powder (20 g) in tetrahydrofuran (100 mL) was added 10% Pd/C (4 g) and the resulting mixture placed in an autoclave. The autoclave was pressurised to 10 Bar with hydrogen and the resulting mixture heated to 45° C. for 4 hours. The resulting mixture was filtered through celite (10) and the volatiles removed. The resulting material was recrystallised from heptane to yield a grey solid (13.4 g 70.6%.

$^1$H NMR (300 MHz, CHLOROFORM-d) δ ppm 7.27 (m, 4H), 6.82 (d, 2H), 4.8 (br s, 2H), 2.67 (t, 4H), 1.67 (m, 4H), 1.35 (m, 36), 0.91 (m, 6H); (75 MHz, 13C, CDCl3) 152.4, 133.9, 128.8, 128.6, 125.3, 115.5, 31.9, 30.2-29.3, 22.7, 14.1.

Compound E

To a 1 L multi-neck flask with overhead stirring, is added phenol (124.9 g), montmorillonite K10 (6.3 g) and high vinylidene decene dimer (409.9 g). The mixture is heated to 150° C. with stirring for at least 11 hours. Cooled and heptane is added, and the heptane solution washed with water (3×100 mL), dried with anhydrous magnesium sulfate, filtered and volatiles removed by vacuum distillation to yield a yellow oil (470 g, 95%).

$^1$H NMR (300 Mz, 1H, $CDCl_3$) 7.2 (2H), 6.8 (2H), 4.7 (1H), 2.0-0.89 (56H); (75 MHz, 13C, $CDCl_3$) 125.8, 140.6, 127.5, 114.7, 43.5, 40.1, 37.1, 31.9, 31.8, 30.5, 30.1, 29.7, 29.6, 29.5, 29.4, 29.3, 28.0, 27.9, 27.1, 24.3, 24.2, 22.7, 14.1.

Compound F

To a suspension of 2-naphthol (40 g), and montmorillonite K5 (4 g) sulfuric acid (0.3 g) and water (1.5 mL) in heptane (125 mL) at 90° C., vinylidene decene dimer (103 g) is added over 5 hours. Reaction is maintained at 90° C. until complete conversion by TLC. On complete consumption of 2-Naphthol, the reaction is cooled to room temperature and the mixture filtered and washed with heptane. The filtrate is treated with water and the phases separated. The organic phase is washed with water and concentrated under vacuum. Residue treated with 2M sodium hydroxide (900 mL) and Heptane, layers separated, and heptane layer acidified by washing with 2M hydrochloric acid and water. Organic layer concentrated at 70° C. under vacuum to give a reddish coloured waxy/oil ~70% pure.

$^1$H NMR (300 MHz, CHLOROFORM-d) δ ppm 7.9 (d, 1H) 7.7 (s, 2H), 7.35 (m, 1H) 7.2 d, 2H), 5.0 (s, 1H), 2.0-1.2 (m, 41).

Deposit Performance Data

Seven trunk piston engine oils (TPEOs) were blended, each having a total base number of 12. The Reference Composition was:

4.3% overbased calcium salicylates 0.1% zinc dialkylthiophosphate anti-wear agent (ZDDP)

5% brightstock

Balanced to 100%, Group I basestock.

Compounds A-F were added to the Reference Composition in the amounts shown in the table below.

| Example | Composition |
|---|---|
| 1 | Reference Composition only |
| 2 | Example 1 + 2 mass % of Compound A |
| 3 | Example 1 + 1.94 mass % of Compound B |
| 4 | Example 1 + 4.4 mass % of Compound C |
| 5 | Example 1 + 1.54 mass % of Compound D |
| 6 | Example 1 + 1.19 mass % of Compound E |
| 7 | Example 1 + 2.02 mass % of Compound F |

The lubricating oil compositions were evaluated for deposit control using the panel coker test. This test involves splashing a pre-aged engine lubricating oil composition on to a heated test panel to see if the oil degrades and leaves any deposits that might affect engine performance.

Lubricating oil compositions are pre-aged by heating to 140° C. under a stream of air at 45 L per hour for 48 hours. The resulting sample is partially neutralized with 0.27 mass % sulfuric acid.

The test uses a panel coker tester (model K50119) supplied by Koehler Instrument Company Inc. New York, USA. The test starts by heating the pre-aged engine lubricating oil composition to a temperature of 100° C. through an oil bath. A test panel made of tool steel, which has been cleaned using acetone and heptane, is placed above the engine lubricating oil composition and heated to 295° C. using an electric heating element. When both temperatures have stabilised, a splasher splashes the engine lubricating oil composition on to the heated test panel in a discontinuous mode: the splasher splashes the oil for 15 seconds and then stops for 60 seconds. The discontinuous splashing takes place over 1 hour, after which the test is stopped, everything is allowed to cool down, and then the steel test panel is rated. The panels are rated using a scanning electron microscope—energy dispersive X-ray spectroscopy to determine the percentage iron (Fe) at the surface not covered by deposit. The readings across the plate are averaged to give a merit rating.

The results are summarized in the table below.

| Example | Average Merits |
|---|---|
| 1 | 35.2 |
| 2 | 73.7 |
| 3 | 71.5 |
| 4 | 77.9 |
| 5 | 66.6 |
| 6 | 35.9 |
| 7 | 31.5 |

It can clearly be seen that the examples of the invention (Examples 2-5) provide significantly better performance (higher Average Merits) then both the Reference Composition and the comparative examples (Examples 6 & 7) which contain compounds which share some structural similarity with the inventive compounds but do not have linked aryl groups.

Asphaltene Dispersancy Performance Data

Five further trunk piston engine oils (TPEOs) were blended, each having a total base number of 30. The Reference Composition was:

10.8% overbased calcium salicylates 0.4% zinc dialkylthiophosphate anti-wear agent (ZDDP)

Balanced to 100%, Group II basestock.

Compounds A-C were added to the Reference Composition in the amounts shown in the table below.

| Example | Composition |
|---|---|
| 8 | Reference Composition only |
| 9 | Example 1 + 2 mass % of Compound A |
| 10 | Example 1 + 1.94 mass % of Compound B |
| 11 | Example 1 + 4.4 mass % of Compound C |

The lubricating oil compositions were evaluated for asphaltene dispersancy using the Focused Beam Reflectance Method (FBRM). This technique provides a measurement of asphaltene agglomeration and so is indicative of the tendency of the lubricating oil to prevent piston deposits when used to lubricate an engine. The FBRM test method utilizes a fiber optic probe. The tip of the probe contains an optic which focuses the laser light to a small spot. The optic is rotated so that the focused beam scans a circular path over a window, past which the oil sample to be measured flows. As asphaltene particles in the oil flow past the window they intersect the scanning light path and backscattered light from the particles is collected. The scanning laser beam travels much faster than the particles which means that relative to the light, the particles are effectively stationary. As the focused beam intersects one edge of a particle, the amount of backscattered light collected increases, decreasing again as the beam reaches the other edge of the particle. The instrument determines the time period over which increased backscattered light is detected. Multiplying this time period by the scan speed of the laser provides a distance. This distance is a chord length as it is the length of a straight line between two points on the edge of a particle.

The FBRM technique measures tens of thousands of chord lengths per second so provides a chord length distribution, usually expressed in microns. An accurate measure of the particle size distribution of asphaltene particles in the sample is thus obtained.

The FBRM equipment used was model Lasentec G400 supplied by Mettler Toledo, Leicester, UK. It was configured to give a particle size resolution of between 1 μm and 1 mm. The data obtained can be presented in several ways but our studies have shown that the average counts per second can be used as a quantitative measure of asphaltene dispersancy. This value is a function of both the average particle size and the degree of agglomeration.

The results are summarized in the table below.

| Example | Average Counts | Difference to Reference |
|---|---|---|
| 8 | 43067.72 | — |
| 9 | 38120.13 | −4947.59 |
| 10 | 26842.08 | −16225.6 |
| 11 | 37488.04 | −5579.68 |

Taken together with the deposit performance data, these data demonstrate that compositions of the invention exhibit both excellent deposit prevention performance and good asphaltene dispersancy.

All documents described herein are incorporated by reference herein, including any priority documents and/or testing procedures, to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A lubricating oil composition comprising 50 mass % or more of an oil of lubricating viscosity and 0.1 to 25 mass % of at least one of compounds of structures (I), (II), or (III):

(I)

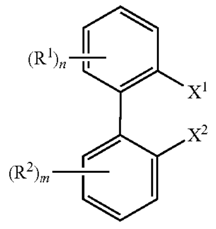

(II)

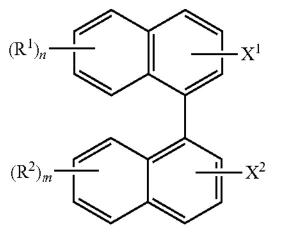

(III)

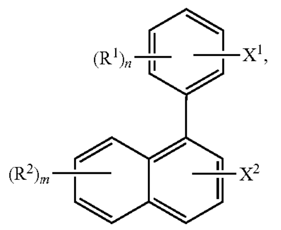

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero, and wherein if m=0, then $R^1$ has at least 4 carbon atoms, and wherein if n=0, then $R^2$ has at least 4 carbon atoms.

2. A composition according to claim 1 wherein structures (II), and (III) are structures (Ha), and (Ma):

(IIa)

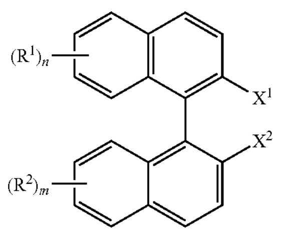

(IIIa)

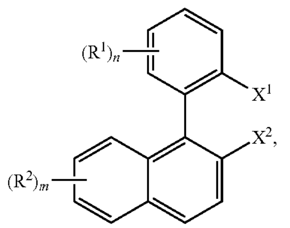

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero, and wherein if m=0, then $R^1$ has at least 4 carbon atoms, and wherein if n=0, then $R^2$ has at least 4 carbon atoms.

3. A composition according to claim 1 wherein $X^1$ and $X^2$ are both OH.

4. A composition according to claim 1 wherein m and n are both 1.

5. A composition according to claim 1 wherein $R^1$ and $R^2$ are the same or different and are linear or branched alkyl or alkenyl groups having from 4 to 36 carbon atoms.

6. A composition according to claim 1 wherein $R^1$ and $R^2$ are the same.

7. A composition according to claim 1 wherein $R^1$ and $R^2$ are both linear alkyl groups having 8 to 18 carbon atoms.

8. A composition according to claim 1 wherein $R^1$ and $R^2$ are both branched alkyl groups having 8 to 24 carbon atoms.

9. A composition according to claim 1 further comprising 0.1 to 25 mass % of at least one metal-containing detergent compound.

10. A composition according to claim 1 wherein $X^1$ and $X^2$ are both OH; m and n are both 1; and $R^1$ and $R^2$ are the same or different and are linear or branched alkyl or alkenyl groups having from 4 to 36 carbon atoms.

11. A composition according to claim 1 wherein $R^1$ and $R^2$ are the same, and 1) $R^1$ and $R^2$ are both linear alkyl groups having 8 to 18 carbon atoms; or 2) $R^1$ and $R^2$ are both branched alkyl groups having 8 to 24 carbon atoms.

12. A composition according to claim 2 wherein $X^1$ and $X^2$ are both OH; m and n are both 1; and $R^1$ and $R^2$ are the same or different and are linear or branched alkyl or alkenyl groups having from 4 to 36 carbon atoms.

13. A composition according to claim 2 wherein $R^1$ and $R^2$ are the same, and 1) $R^1$ and $R^2$ are both linear alkyl groups having 8 to 18 carbon atoms; or 2) $R^1$ and $R^2$ are both branched alkyl groups having 8 to 24 carbon atoms.

14. A lubricating oil composition comprising 50 mass % or more of an oil of lubricating viscosity and 0.1 to 25 mass % of at least one of compounds A, B, C, and D:

A

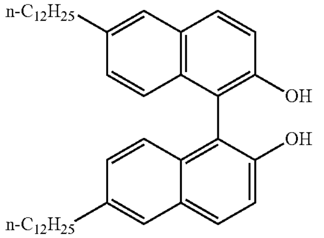

B

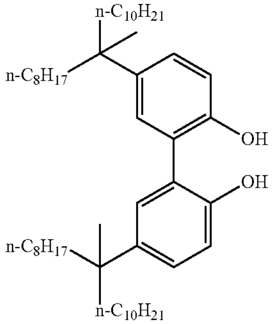

C

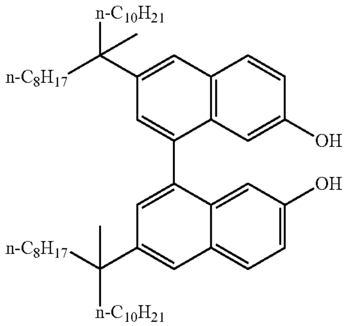

D

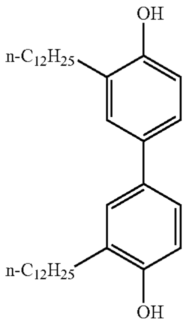

15. A method of ameliorating or preventing deposits in an engine during its operation, the method comprising lubricating the engine with a lubricating oil composition according to claim 1.

16. A method of ameliorating or preventing deposits in an engine during its operation, the method comprising lubricating the engine with a lubricating oil composition according to claim 2.

17. A method of ameliorating or preventing deposits in an engine during its operation, the method comprising lubricating the engine with a lubricating oil composition according to claim 14.

18. A method according to claim 15 wherein the engine is a compression-ignited engine.

19. A method of dispersing asphaltenes in a trunk piston marine lubricating oil composition during its lubrication of surfaces of the combustion chamber of a compression-ignited marine engine and operation of the engine, which method comprises:

(i) providing a lubricating composition according to claim 1;

(ii) providing the composition in the combustion chamber;

(iii) providing heavy fuel oil in the combustion chamber; and (iv) combusting the heavy fuel oil in the combustion chamber.

20. A method of dispersing asphaltenes in a trunk piston marine lubricating oil composition during its lubrication of surfaces of the combustion chamber of a compression-ignited marine engine and operation of the engine, which method comprises:

(i) providing a lubricating composition according to claim 2;

(ii) providing the composition in the combustion chamber;

(iii) providing heavy fuel oil in the combustion chamber; and (iv) combusting the heavy fuel oil in the combustion chamber.

21. A method of dispersing asphaltenes in a trunk piston marine lubricating oil composition during its lubrication of surfaces of the combustion chamber of a compression-ignited marine engine and operation of the engine, which method comprises:

(i) providing a lubricating composition according to claim 14;

(ii) providing the composition in the combustion chamber;

(iii) providing heavy fuel oil in the combustion chamber; and (iv) combusting the heavy fuel oil in the combustion chamber.

22. A method to ameliorate or prevent deposits in an engine during its operation comprising the use of a lubricating oil composition comprising at least one compound of structures (I), (II), or (III):

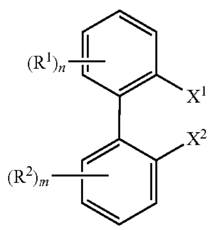

(I)

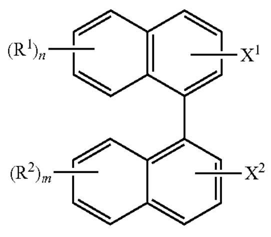

(II)

-continued (III)

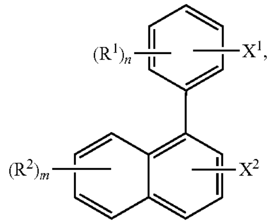

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero, wherein the at least one compound of structure (I), (II), or (III) is present in the lubricating oil composition in an amount of 0.1 to 25 mass %, based on the mass of the composition, and wherein if m=0, then $R^1$ has at least 4 carbon atoms, and wherein if n=0, then $R^2$ has at least 4 carbon atoms.

23. A method to disperse asphaltenes in a trunk piston marine lubricating oil composition comprising the use of a lubricating oil composition comprising at least one compound of structures (I), (II), or (III) in a trunk piston marine lubricating oil composition during its lubrication of surfaces of the combustion chamber of a compression-ignited marine engine operated by combusting a heavy fuel oil:

(I)

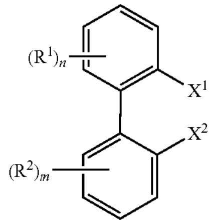

(II)

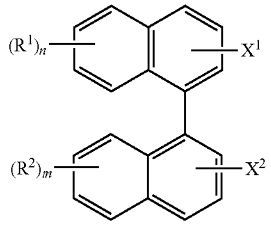

(III)

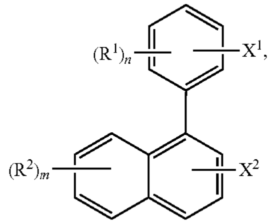

wherein $X^1$ and $X^2$ are the same or different and are OH, $NH_2$ or SH; wherein $R^1$ and $R^2$ are the same or different and are linear or branched, saturated or unsaturated hydrocarbon groups having from 1 to 50 carbon atoms, with the proviso that at least one of $R^1$ and $R^2$ has at least 4 carbon atoms; wherein m and n are the same or different and are zero or an integer from 1 to 3 with the proviso that m and n are not both zero, and wherein if m=0, then $R^1$ has at least 4 carbon atoms, and wherein if n=0, then $R^2$ has at least 4 carbon atoms.

24. The method according to claim 22 wherein structures (II), and (III) are structures (Ha), and (Ma):

(IIa)

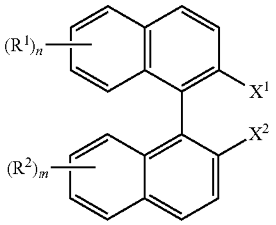

(IIIa)

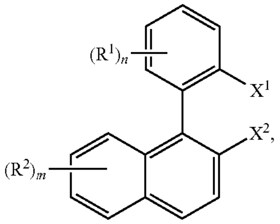

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero, and wherein if m=0, then $R^1$ has at least 4 carbon atoms, and wherein if n=0, then $R^2$ has at least 4 carbon atoms.

25. The method according to claim 23 wherein structures (II), and (III) are structures (Ha), and (Ma):

(IIa)

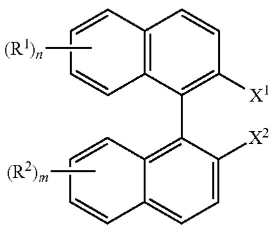

(IIIa)

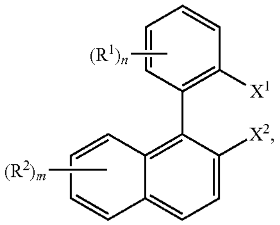

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero, and wherein if m=0, then $R^1$ has at least 4 carbon atoms, and wherein if n=0, then $R^2$ has at least 4 carbon atoms.

26. A composition according to claim 1 wherein structure (I) does not comprise 4,4'-dihydroxy-3,3',5,5'-tetra-tert-butylbiphenyl.

27. A composition according to claim 1 wherein $X^1$ and $X^2$ are positioned at the 2 and 2' position relative to the aromatically bridged carbon of the biaryl structures.

28. A composition according to claim 1 wherein $X^1$ and $X^2$ are —OH and are positioned at the 2 and 2' position relative to the aromatically bridged carbon of the biaryl structures.

29. A lubricating oil composition comprising less than 50 mass % of an oil of lubricating viscosity and 0.1 to 25 mass % of at least one of compounds of structures (I), (II), or (III):

(I)

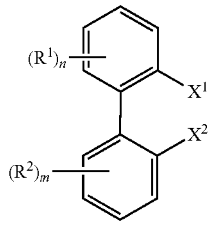

(II)

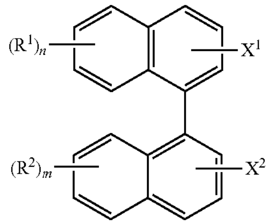

(III)

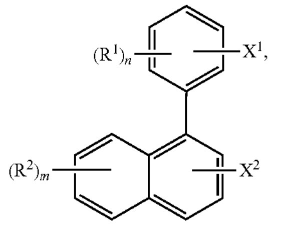

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; and wherein m and n are the same or different and are zero or an integer from 1 to 3 with the proviso that m and n are not both zero, and wherein if m=0, then $R^1$ has at least 4 carbon atoms, and wherein if n=0, then $R^2$ has at least 4 carbon atoms.

30. A composition according to claim 29 wherein structures (II), and (III) are structures (IIa), and (IIIa):

(Ia)

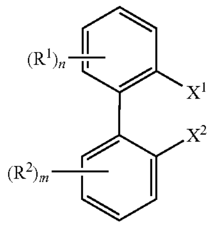

(IIa)

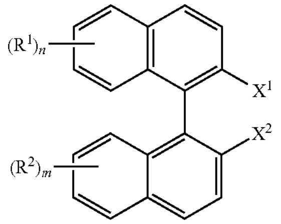

(IIIa)

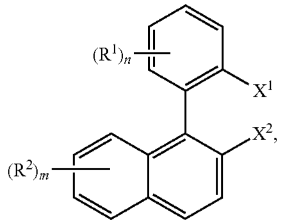

wherein $X^1$ and $X^2$ are the same or different and are OH, $NH_2$ or SH; wherein groups $R^1$ and $R^2$ are the same or different and are linear or branched, saturated or unsaturated hydrocarbon groups having from 1 to 50 carbon atoms, with the proviso that at least one of groups $R^1$ and $R^2$ has at least 4 carbon atoms; wherein m and n are the same or different and are zero or an integer from 1 to 3 with the proviso that m and n are not both zero, and wherein if m=0, then $R^1$ has at least 4 carbon atoms, and wherein if n=0, then $R^2$ has at least 4 carbon atoms.

31. A method of ameliorating or preventing deposits in an engine during its operation, the method comprising lubricating the engine with a lubricating oil composition according to claim 10.

32. A method of ameliorating or preventing deposits in an engine during its operation, the method comprising lubricating the engine with a lubricating oil composition according to claim 11.

33. A method of ameliorating or preventing deposits in an engine during its operation, the method comprising lubricating the engine with a lubricating oil composition according to claim 12.

34. A method of ameliorating or preventing deposits in an engine during its operation, the method comprising lubricating the engine with a lubricating oil composition according to claim 26.

35. A method of ameliorating or preventing deposits in an engine during its operation, the method comprising lubricating the engine with a lubricating oil composition according to claim 27.

36. A method of ameliorating or preventing deposits in an engine during its operation, the method comprising lubricating the engine with a lubricating oil composition according to claim 28.

* * * * *